[19] United States Patent
Hiraiwa

[11] Patent Number: 4,805,484
[45] Date of Patent: Feb. 21, 1989

[54] POWER TRANSFER MECHANISM FOR FOUR-WHEEL DRIVE

[75] Inventor: Kazuyoshi Hiraiwa, Atsugi, Japan

[73] Assignee: Nissan Motor Co., Ltd., Japan

[21] Appl. No.: 105,445

[22] Filed: Oct. 5, 1987

Related U.S. Application Data

[63] Continuation of Ser. No. 754,922, Jul. 15, 1985, abandoned.

[30] Foreign Application Priority Data

Jul. 19, 1984 [JP] Japan ................................ 59-148546
Mar. 28, 1985 [JP] Japan ................................ 60-62100

[51] Int. Cl.4 ............................................ F16H 37/08
[52] U.S. Cl. ................................... 74/665 T; 74/674; 74/714; 180/247
[58] Field of Search .............. 180/247, 248, 249, 250; 74/714, 766, 767, 768, 769, 665 T, 710.5, 674

[56] References Cited

U.S. PATENT DOCUMENTS

| | | | |
|---|---|---|---|
| 2,170,444 | 8/1939 | Barbarou | 74/768 |
| 2,827,805 | 3/1958 | Miller | 74/769 |
| 3,492,890 | 2/1970 | Hill et al. | 180/249 X |
| 3,722,323 | 3/1973 | Welch | 74/769 |
| 3,908,775 | 9/1975 | Van Fossen | 180/44 R |
| 4,074,591 | 2/1978 | Dick | 74/674 |
| 4,233,861 | 11/1980 | Gaus et al. | 74/766 |
| 4,317,389 | 3/1982 | Falzoni | 74/714 |
| 4,541,503 | 9/1985 | Akutagawa et al. | 180/247 |
| 4,589,304 | 5/1986 | Ashikawa et al. | 74/714 X |
| 4,677,875 | 7/1987 | Batchelor | 74/714 X |
| 4,696,205 | 9/1987 | Marks | 74/767 |
| 4,722,246 | 2/1988 | Gaus et al. | 74/674 X |

FOREIGN PATENT DOCUMENTS 3334905 4/1984 Fed. Rep. of Germany .

OTHER PUBLICATIONS

Automobil-Industrie, 4/79, "Planetengetriebe in automatischen Fahrzeuggetrieben", Jurgen Pickard.

Primary Examiner—Leslie A. Braun
Assistant Examiner—Dwight G. Diehl
Attorney, Agent, or Firm—Lane and Aitken

[57] ABSTRACT

A power transfer mechanism comprises a planetary gear assembly incorporating double planet gears which are in mesh with each other and journalled on a carrier. Input member is drivingly connected to the ring gear and first output member is drivingly connected to carrier. The mechanism further includes means shiftable to one of a plurality of operating positions engaging sun gear with a second output member.

11 Claims, 3 Drawing Sheets

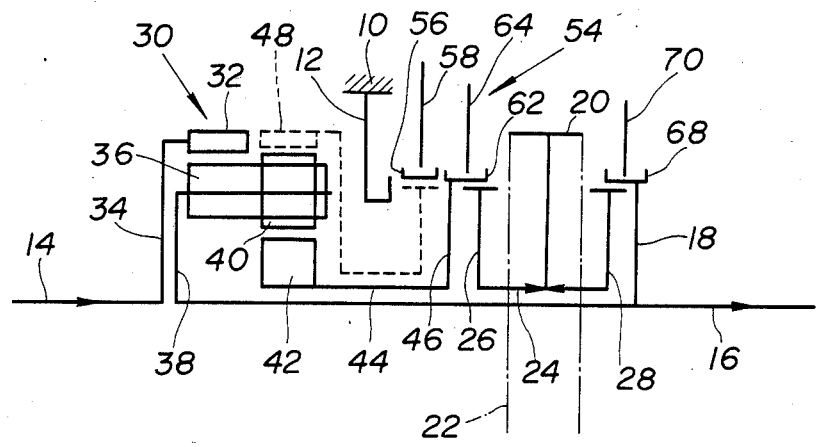

POWER TRANSFER MECHANISM FOR FOUR-WHEEL DRIVE

This application is a continuation of application Ser. No. 754,922 filed 7/15/85 now abandoned.

BACKGROUND OF THE INVENTION

The present invention relates to a power transfer mechanism for a four-wheel drive motor vehicle.

A power transfer mechanism for a four-wheel drive automotive vehicle is known. The known mechanism includes a sub-transmission which may be shifted to establish a high-range mode or a low-range mode. The mechanism also includes a center differential which absorbs a difference in rotation between two output members for front axle and rear axle of an associated four-wheel drive vehicle. The mechanism, therefore, requires a large number of component parts, resulting in a construction which is bulky, heavy and expensive to manufacture.

In order to alleviate the above deficiencies, there has been proposed a power transfer mechanism incorporating a single planetary gear assembly as disclosed in U.S. Pat. No. 4,074,591. The planetary gear assembly includes a shifting mechanism. The shifting mechanism may be shifted to establish a high-range mode wherein the carrier acts as an input member and the sun and ring gears as output members to establish torque proportioning differential action. The mechanism may be shifted to establish a low-range mode wherein the sun gear acts as an input member, the ring gear as a reaction member, and the carrier as an output member to provide locked-up reduction drive. The use of a single planetary gear assembly provides a construction which is less bulky, compact, and less heavy. The shifting mechanism includes a pair of shifting sleeves, each supporting a floating collar. In the high-range mode, one sleeve engages the input with the carrier, and its associated floating collar engages the sun gear with one output member. The other sleeve engages the ring gear with the other output member, and its associated floating collar is disengaged. In the low-range mode, the one sleeve engages the input with the sun gear, and its associated floating collar engages the carrier with one output member. The other sleeve engages the carrier with the other output member, and its associated floating collar grounds the ring gear to the housing. The shifting mechanism is mounted in the housing and disposed radially outwardly of the input and output members and radially inwardly of the sun gear. As a result, this disposition of the shifting mechanism is a stumbling block in reducing the over all dimension of the entire mechanism and causes a complicated structure. The fact that the radial dimension is relatively large poses a problem in its installation in an associated four-wheel drive vehicle because the vehicle floor has to be elevated so as to secure the road clearance high enough for the associated four-wheel drive to take full advantage of the power transfer mechanism, thus sacrificing the vehicle's cabin space, or the road clearance has to be sacrificed so as to maintain the vehicle floor as low as possible and to secure sufficiently large vehicle's cabin, thus preventing the associated four-wheel drive vehicle from exibiting good running performance in passing through the rough terrain. Besides, in the high-range mode, since the input member is engaged with the carrier, and the ring gear is engaged with the output members for transferring torque to the rear axle of an associated four-wheel drive vehicle and the sun gear is engaged with the other output member for transferring torque to the front axle of the four-wheel drive vehicle, torque transferred to the rear axle is always larger than torque transferred to the front axle by a considerable amount owing to considerable difference in length between the arms with which the ring and sun gears turn the associated output members. This causes an associated four-wheel drive to show oversteering characteristic when making a turn. Lastly, since the input is engaged with the sun gear (in the low-range mode) or the carrier (in the high-range mode), the reduction ratio having a sufficiently small value cannot be obtained.

There is a need to provide a power transfer mechanism which establishes at least approximately even distribution in torque between two output members when the mechanism is shifted to the torque proportioning differential drive range.

An object of the present invention is to provide a power transfer mechanism which meets the above mentioned need.

SUMMARY OF THE INVENTION

According to the present invention, a power transfer mechanism incorporates a planetary gear assembly which includes a ring gear drivingly connected to an input member, a carrier drivingly connected to one of output members, a sun gear, a plurality of first planet gears journalled on the carrier and being in mesh with the ring gear, a plurality of second planet gears journalled on the carrier, each of the second planet gears being in mesh with an associated one of the first planet gears and being in mesh with the sun gear. The planetary gear assembly including means for shifting the power transfer mechanism to a plurality of operating modes. The shifting means may be shifted to one of the plurality of operating positions engaging the sun gear with the other output member..

The planetary gear assembly may include a rotary element in mesh with one of the first and second planet gears. The shifting means may be shifted to locked-up reduction ratio drive position wherein the rotary element is grounded and the both output members are engaged with each other. The shifting means may be shifted to another drive position engaging the sun gear with the rotary element, thus establishing a torque path to one output member only.

BRIEF DESCRIPTION OF THE DRAWINGS

FIG. 3 is a schematic diagram showing the power transfer mechanism in lock-up four-wheel drive mode;

FIG. 4 is a schematic diagram showing the power transfer mecahnism in low four-wheel reduction drive mode;

DESCRIPTION OF THE PREFERRED EMBODIMENTS

Figure 1:
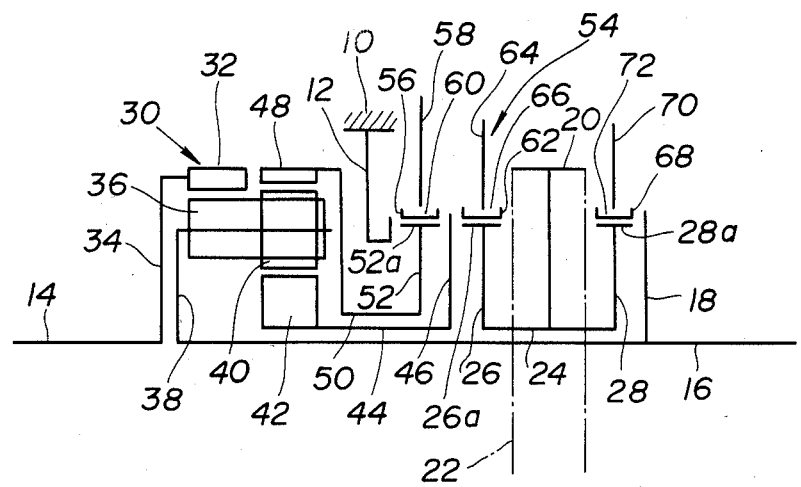
FIG. 1 is a schematic diagram showing one embodiment of a power transfer mechanism according to the preset invention in neutral.

Referring to the accompanying drawings, the preferred embodiments according to the present invention are described. Referring particularly to FIG. 1, there is shown schematically a housing 10 of a transfer case for use in an associated four-wheel drive automotive vehicle. An arm 12 is rigidly secured to housing 10 and thus forms a portion thereof. Arm 12 defines a brake element which may be teeth (not shown).

An input member 14 which may be the output shaft of a manual or automatic transmission incorporated in an associated automotive vehicle extends and is rotatable about the common axis about which a first output member 16 is rotatable. First output member 16 may be an output shaft which transfers torque to the rear axle of an associated four-wheel drive vehicle. First output member 16 includes a radially outwardly extending portion 18 which defines on its outer periphery a clutch element which may be teeth (not shown). A second output member 20 is a sprocket which transfers torque through a chain 22 to the front axle of an associated four-wheel drive vehicle. Output member 20 defines a sleeve portion 24 rotatably mounted on output member 16, first and second radially outwardly extending portions 26, 28 extending from the both axial ends of the sleeve portion 24, respectively. First and second radially outwardly extending portions 26, 28 define on their outer peripheries splines 26a, 28a, respectively.

A planetary gear assembly 30 is mounted within housing 10. Assembly 30 includes a ring gear 32. Via a radially extending portion 34, ring gear 32 is drivingly connected to the input shaft 14. A plurality of first planet gears 36 are journalled on a carrier 38 and in mesh with ring gear 32. A plurality of second planet gears 40 are journalled on carrier 38 and each of second planet gears 40 is in mesh with one of first planet gears 36. Second planet gears 40 are in mesh with a sun gear 42. Carrier 38 is drivingly connected to first output shaft 16. Sun gear 42 includes a sleeve portion 44 extending axially from the sun gear 42 and rotatably mounted on first output shaft 16, and a radially outwardly extending portion 46 extending from the sleeve portion 44 and defining on its outer periphery a clutch element which may be teeth (not shown). A rotary element 48 in the form of a second ring gear is in mesh with second planet gears 40. Rotary element 48 includes a floating collar portion 50 mounted around the sleeve portion 44 of sun gear 42, and a radially outwardly extending portion 52 which defines on its outer periphery a clutch element which may be spline 52a.

Planetary gear assembly 30 incorporates a shifting mechanism 54 which includes a first clutch sleeve or shift member 56 which is engaged with spline 52a of the radially outwardly extending portion 52 of rotary element 48. Thus, clutch sleeve 56 is axially shiftable relative to but rotatable with rotary element 48. A shift fork 58 engages in a groove 60 defined by clutch sleeve 56.

Shifting mechanism 54 also includes a second clutch sleeve or shift member 62 which is engaged with spline 26a of first radially outwardly extending portion 26 of second output member 20. Thus, clutch sleeve 62 is axially shiftable relative to but rotatable with second output member 20. A shift fork 64 engages in a groove 66 defined by the clutch sleeve 62.

Shifting mechanism 54 also includes a third clutch sleeve or shift member 68 which is engaged with spline 28a of second radially outwardly extending portion 28 of second output member 20. Thus, clutch sleeve 68 is axially shiftable relative to but rotatable with second output member 20. A shift fork 70 engages in a groove 72 defined by clutch sleeve 68.

HIGH-RANGE FOUR-WHEEL DRIVE MODE

Figure 2:
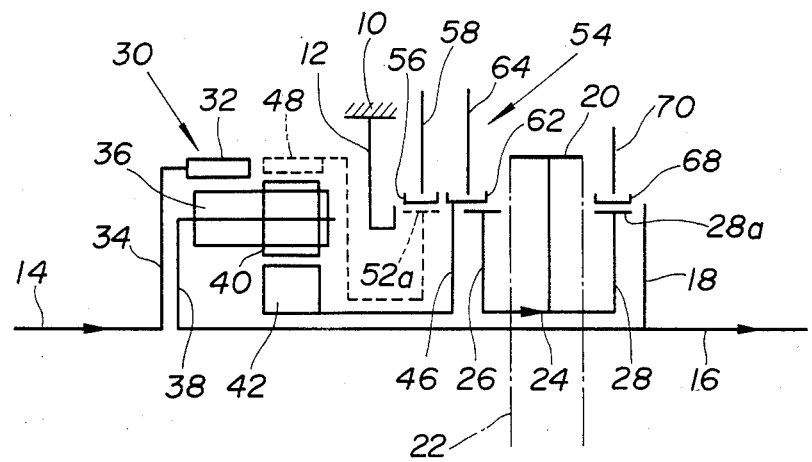
FIG. 2 is a schematic diagram showing the power transfer mechanism in torque proportioning four-wheel drive mode.

As shown in FIG. 2, shifting mechanism 54 which may be shifted via shift forks 58, 64, 70 by a shift lever (not shown) is in the high-range four-wheel drive position establishing torque proportioning four-wheel drive. Teeth of second clutch sleeve 62 are in mesh with teeth of radially outwardly extending portion 46 of sun gear 42. As a result, sun gear 42 is engaged with second output member 20 through second clutch sleeve 62. The other two clutch sleeves 56, 68 are disengaged.

Torque is transferred from input member 14 to ring gear 32. Second ring gear 48 is free to rotate. First and second planet gears 36, 40 are free to planatate, and torque is transferred from carrier 38 to first output member 16 and from sun gear 42 to second output member or sprocket 20 in accordance with their associated rear and front axles. Difference in rotation between front and rear axles which may occur when an associated four-wheel vehicle makes a turn causes rotation of first and second planet gears 36, 40. Thus, planetary gear assembly 30 acts as a center differential to absorb difference in rotation.

The length of arm during transferring torque from carrier 38 to first output member 16 and the length of arm during transferring torque from carrier 38 to sun gear 42, viz., during transferring torque from carrier 38 to second output member 20, are approximately 1:1. As a result, torque transferred to the front axle and that to the rear axle are approximately 1:1, avoiding oversteering owing to excessively uneven distribution of torque in favour of the rear axle, thus enhancing controllability and stability of the associated four-wheel drive vehicle.

LOCK-UP HIGH-RANGE FOUR-WHEEL DRIVE MODE

In FIG. 3, shifting mechanism 54 has been shifted to the lock-up high-range four-wheel drive position establishing locked-up high-range four-wheel drive. Teeth of second clutch sleeve 62 remains in mesh with teeth of radially outwardly extending portion 46 of sun gear 42, and teeth of third clutch sleeve 68 are now in mesh with teeth of radially outwardly extending portion 18 of first output member 16. As a result, second output member 20 is engaged with first output member 16 through third clutch sleeve 68, causing sun gear 42 and carrier 38 to rotate as a unit. Planetary gear assembly 30 does not act as a center differential, preventing slip between first and second output members 16, 20, thereby making it easy for an associated four-wheel drive vehicle to pass through rough terrain.

LOCK-UP LOW RANGE FOUR-WHEEL DRIVE MODE

In FIG. 4, shifting mechanism 54 has been shifted to the lock-up low-range four-wheel drive position establishing locked-up four-wheel reduction ratio drive. Teeth of third clutch sleeve 68 is in mesh with teeth of radially outwardly extending portion 18 of first output member 16. As a result, second output member 20 is engaged with first output member 16 through third clutch sleeve 68. Teeth of second clutch sleeve 62 is out of mesh with teeth of radially outwardly extending portion 46 of sun gear 42. Teeth of first clutch sleeve 56 is in mesh with teeth of arm 12. As a result, the second ring gear 48 is grounded or anchored to housing 10.

Torque is transferred from input member 14 to ring gear 32. Second ring gear 48 acts as a reaction member. First and second planet gears 36, 40 planatate and reduction ratio torque is directed to carrier 38. As both first and second output members 16, 20 are engaged with carrier 38, power transfer mechanism in low-range four-wheel drive mode provides locked-up reduction ratio torque to both first and second output members 16, 20, thus enabling the associated four-wheel drive vehicle to perform four-wheel drive with sufficiently high power.

As both first and second planet gears 36, 40 rotate during their planet movement, the reduction ratio may be increased to a value near 2.

TWO-WHEEL DRIVE MODE

Figure 5:
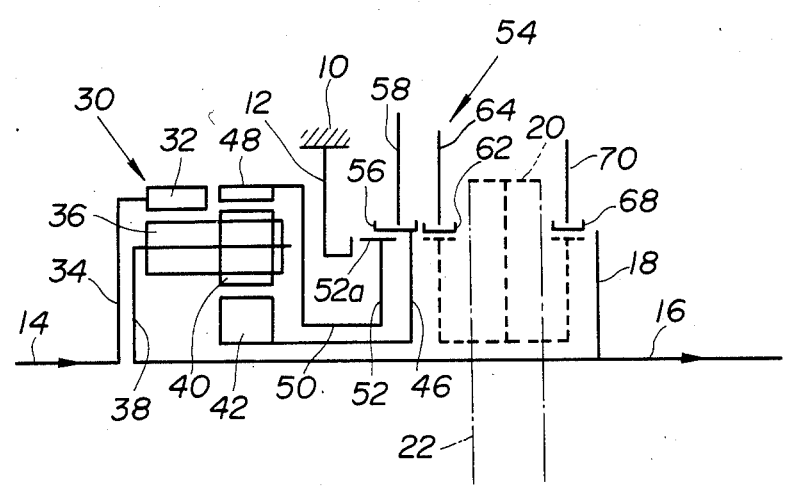
FIG. 5 is a schematic diagram showing the power transfer in two-wheel drive mode.

In FIG. 5, shifting mechanism 54 has been shifted to the two-wheel drive position establishing two-wheel drive. Teeth of first clutch sleeve 56 is out of mesh with teeth of arm 12 rigidly secured to housing 10 and is now in mesh with teeth of radially outwardly extending portion 46 of sun gear 42. As a result, sun gear 42 is engaged through first clutch sleeve 56 with second ring gear 48. Teeth of second clutch sleeve 62 is out of mesh with teeth of radially outwardly extending portion 46 of sun gear 42. As a result, sun gear 42 is disengaged from second output member 20. Teeth of third clutch sleeve 68 is out of mesh with teeth of radially outwardly extending portion 18 of first output member 16. As a result, second output member 20 is disengaged from first output member 16.

Torque is transferred from input member 14 to ring gear 32, and torque is directed through first planet gears 36 and carrier 38 to first output member 16, thus transferring torque only to first output member 16 that transfers torque to the rear axle of the associated four-wheel drive vehicle.

From the previous description of the embodiment, it will be understood that since input torque is transferred to the ring gear and torque is transferred from carrier to the first output member and from the sun gear to the second output member when the shifting mechanism is in the four-wheel drive position, the ratio of torque transferred to the first output member to that to the second output member has been made almost 1:1 or it is made 1:1.

It will also be understood that the transfer mechanism provides the two-wheel drive.

The shifting mechanism comprises three clutch sleeves 56, 62, 68 and these sleeves are axially offset from the planetary gear assembly, thus decreasing the overall radial dimension of the power transfer mechanism. Although in the previously described embodiment, the shifting mechanism using the clutch sleeves is described, the shifting mechanism may take other form, such as one using friction clutch and/or brake means.

Although, the previously described embodiment uses second ring gear 48 as the rotary element which is grounded to housing (see FIG. 4) or engaged with sun gear 42 (see FIG. 5), a second sun gear in mesh with first planet gears may be used instead of second ring gear 48 as such rotary element.

Figure 6:
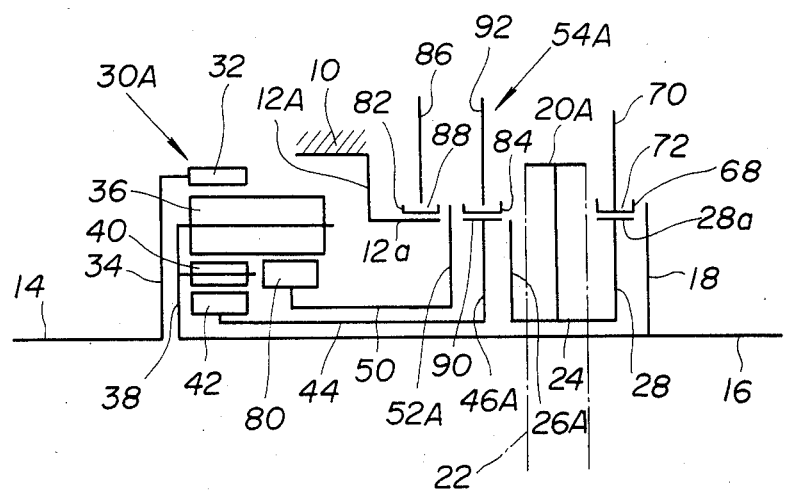
FIG. 6 is a schematic diagram showing another embodiment of a power transfer mechanism according to the present invention.

This will be more specifically described referring to FIG. 6 which shows a second embodiment of a power transfer mechanism.

As will be readily understood to those skilled in the art, the second embodiment is substantially the same as the first embodiment shown in FIG. 1 except that a planetary gear assembly 30A incorporates a rotary element in the form of a second sun gear 80 which is in mesh with first planet gears 36 instead of second ring gear 48 and that a shifting mechanism 54A includes first and second clutch sleeves or shift members 82, 84 which are sligtly different from their counterparts 56, 62 shown in FIG. 1 in their mounting manner.

Referring to FIG. 6, first clutch sleeve 82 is engaged with spline 12a formed on an arm 12A extending from a housing 10. Thus, first clutch sleeve 82 is axially shiftable relative to spline 12a formed on arm 12A. Clutch sleeve 82 is shiftable rightwardly as viewed in FIG. 6 to a position engaging with teeth (not shown) formed on a radially outwardly extending portion 52A of second sun gear 80. A shift fork 86 engages in a groove 88 defined by clutch sleeve 82.

Second clutch sleeve 84 is engaged with spline 90 formed on a radially outwardly extending portion 46A of sun gear 42. Thus, second clutch sleeve 84 is axially shiftable relative to spline 90 of radially outwardly extending portion 46A of sun gear 42. Second clutch sleeve 84 is shiftable rightwardly as viewed in FIG. 6 to a position engaging with teeth formed on a radially outwardly extending portion 26A of a second output member 20A. Second clutch sleeve 84 is shiftable leftwardly as viewed in FIG. 6 to a position engaging with teeth formed on a radially outwardly extending portion 52A of second sun gear 80. A shift fork 92 engages in a groove 94 defined by clutch sleeve 84.

HIGH-RANGE FOUR-WHEEL DRIVE MODE

Shifting mechanism 54A may be shifted to the high-range four-wheel drive position establishing torque proportioning four-wheel drive. Teeth of second clutch sleeve 84 are in mesh with teeth of radially outwardly extending portion 26A of second output member 20A. As a result, sun gear 42 is engaged with second output member 20A through second clutch sleeve 84. The other two clutch sleeves 82, 68 are disengaged.

Torque is transferred from input member 14 to ring gear 32. First and second planet gears 36, 40 are free to planatate, and torque is transferred from carrier 38 to first output member 16 and from sun gear 42 to second output member or sprocket 20A in accordance with their associated rear and front axles. Difference in rotation between front and rear axles which may occur when an associated four-wheel vehicle makes a turn causes rotation of first and second planet gears 36, 40. Thus, planetary gear assembly 30 acts as a center differential to absorb difference in rotation.

LOCK-UP HIGH-RANGE FOUR-WHEEL DRIVE MODE

Shifting mechanism 54A has been shifted to the lock-up high-range four-wheel drive position establishing locked-up high-range four-wheel drive. Teeth of second clutch sleeve 84 remains in mesh with teeth of radially outwardly extending portion 26A of second output member 20A, and teeth of third clutch sleeve 68 are now in mesh with teeth of radially outwardly extending portion 18 of first output member 16. As a result, second output member 20A is engaged with first output member 16 through third clutch sleeve 68, causing sun gear 42 and carrier 38 to rotate as a unit. Planetary gear assembly 30A does not act as a center differen-

LOCK-UP LOW-RANGE FOUR-WHEEL DRIVE MODE

Shifting mechanism 54A has been shifted to the lock-up low-range four-wheel drive position establishing locked-up four-wheel reduction ratio drive. Teeth of third clutch sleeve 68 is in mesh with teeth of radially outwardly extending portion 18 of first output member 16. As a result, second output member 20A is engaged with first output member 16 through third clutch sleeve 68. Teeth of second clutch sleeve 84 is out of mesh with teeth of radially outwardly extending portion 26A of second output member 20A. Teeth of first clutch sleeve 82 is in mesh with teeth of radially outwardly extending portion 52A of second sun gear 80. As a result, the second sun gear 80 is grounded or anchored to housing 10.

Torque is transferred from input member 14 to ring gear 32. Second sun gear 80 acts as a reaction member. First and second planet gears 36, 40 planatate and reduction ratio torque is directed to carrier 38. As both first and second output members 16, 20A are engaged with carrier 38, power transfer mechanism in low-range four-wheel drive mode provides locked-up reduction ratio torque to both first and second output members 16, 20A.

TWO-WHEEL DRIVE MODE

Shifting mechanism 54A has been shifted to the two-wheel drive position establishing two-wheel drive. Teeth of first clutch sleeve 82 is out of mesh with teeth of radially outwardly extending portion 52A of second sun gear 80. Teeth of second clutch sleeve 84 is now in mesh with teeth of radially outwardly extending portion 46A of second sun gear 80. As a result, sun gear 42 is engaged through second clutch sleeve 84 with second sun gear 80. Teeth of second clutch sleeve 84 is out of mesh with teeth of radially outwardly extending portion 26A of second output member 20A. As a result, sun gear 42 is disengaged from second output member 20A. Teeth of third clutch sleeve 68 is out of mesh with teeth of radially outwardly extending portion 18 of first output member 16. As a result, second output member 20A is disengaged from first output member 16.

Torque is transferred from input member 14 to ring gear 32, and torque is directed through first planet gears 36 and carrier 38 to first output member 16, thus transferring torque only to the first output member 16.

What is claimed is:

1. A power transfer mechanism comprising:
   an input member;
   a first output member;
   a second output member;
   a planetary gear assembly including a ring gear, a carrier, a plurality of first planet gears in mesh with aid ring gear and journalled on said carrier, a plurality of second planet gears, each in mesh with one of said first planet gears, journalled on said carrier, and a sun gear in mesh with said second planet gears;
   said ring gear being drivingly connected to said input member;
   said carrier being drivingly connected to said first output member; and
   means for shifting said power transfer mechanism to a plurality of operating modes, aid shifting means including first clutch means for selectively engaging said first output member with said second output member and second clutch means for selectively engaging said second output member with said sun gear.

2. A power transfer mechanism comprising:
   an input member;
   a first output member;
   a second output member;
   a planetary gear assembly including a ring gear, a carrier, a plurality of first planet gears in mesh with said ring gear and journalled on said carrier, a plurality of second planet gears, each in mesh with one of said first planet gears, journalled on said carrier, and a sun gear in mesh with said second planet gears;
   said ring gear being drivingly connected to said input member;
   said carrier being drivingly connected to said first output member; and
   means for shifting said power transfer mechanism to a plurality of operating modes, said shifting means including clutch means for selectively engaging said first output member with said second output member;
   wherein said planetary gear assembly includes a rotary element meshing with one of said first and second planet gears, and said shifting means includes means for selectively grounding said rotary element.

3. A power transfer mechanism as claimed in claim 2, wherein said rotary element is in the form of a second ring gear in mesh with said second planet gears.

4. A power transfer mechanism as claimed in claim 2, wherein said rotary element is in the form of a second sun gear meshing with said first planet gears.

5. A power transfer mechanism comprising:
   an input member;
   a first output member;
   a second output member;
   a planetary gear assembly including a ring gear, a carrier, a plurality of first planet gears in mesh with said ring gear and journalled on said carrier, a plurality of second planet gears, each in mesh with one of said first planet gears, journalled on said carrier, and a sun gear in mesh with said second planet gears;
   said ring gear being drivingly connected to said input member;
   said carrier being drivingly connected to said first output member; and
   means for shifting said power transfer mechanism to a plurality of operation modes, said shifting means including clutch means for selectively engaging said first output member with said second output member wherein said planetary gear assembly includes a rotary element meshing with one of said first and second planet gears, and said shifting means includes a clutch movable to a first position where said rotary element is grounded and to a second position where said rotary element is engaged with said sun gear.

6. A power transfer mechanism as claimed in claim 5, wherein said rotary element is in the form of a second ring gear in mesh with said second planet gears.

7. A power transfer mechanism as claimed in claim 5, wherein said rotary element is in the form of a second sun gear in mesh with said first planet gears.

8. A power transfer mechanism comprising:
an input member;
a first output member;
a second output member;
a planatary gear assembly including a ring gear, a carrier, a plurality of first planet gears in mesh with said ring gear and journalled on said carrier, a plurality of second planet gears, each in mesh with one of said first planet gears, journalled on said carrier, and a sun gear in mesh with said second planet gears;
said ring gear being drivingly connected to said input member;
said carrier being drivingly connected to said first output member; and
means for shifting said power transfer mechanism to a plurality of operating modes, said shifting means including first clutch means for selectively engaging said first output member with said second output member downstream of said planet gears with respect to the flow of power from said input member to said output members and a second clutch means for selectively engaging said second output member with said sun gear.

9. A power transfer mechanism comprising:
an input member;
a first output member;
a second output member being hollowed to allow extension of said first output member and thus coaxially arranged with respect to said first output member;
a planetary gear assembly including a ring gear drivingly connected to said input member, a plurality of first planet gears in mesh with said ring gear, a plurality of second planet gears, each in mesh with one of said first planet gears, a planet carrier rotatably carrying said plurality of first planet gears and said plurality of second planet gears, and sun gear in mesh with said plurality of second planet gears;
said sun gear being hollowed to allow extension of said first output member therethrough;
said planet carrier being drivingly connected to said first output member;
said planetary gear assembly further including a rotary member in mesh with one of: said plurality of first planet gears and said plurality of second planet gears;
first clutch means for selectively engaging said sun gear with said second output member;
second clutch means for selectively engaging said first output member with said second output member; and
brake means for preventing rotation of said rotary member.

10. A power transfer mechanism as claimed in claim 9 wherein said rotary member is in the form of a second ring gear in mesh with said plurality of second planet gears.

11. A power transfer mechanism as claimed in claim 10, wherein said rotary member is in the form of as second sun gear in mesh with said plurality of first planet gears.

* * * * *